(12) United States Patent
Tomozawa

(10) Patent No.: US 7,581,782 B2
(45) Date of Patent: Sep. 1, 2009

(54) VEHICLE BODY SIDE STRUCTURE

(75) Inventor: Kosaku Tomozawa, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/043,454

(22) Filed: Mar. 6, 2008

(65) Prior Publication Data

US 2008/0231078 A1    Sep. 25, 2008

(30) Foreign Application Priority Data

Mar. 20, 2007    (JP) .............................. 2007-073050

(51) Int. Cl.
*B60J 9/00*    (2006.01)
(52) U.S. Cl. .............................. 296/187.12; 296/193.05
(58) Field of Classification Search ............ 296/187.12, 296/193.05
See application file for complete search history.

(56) References Cited

U.S. PATENT DOCUMENTS 6,474,726 B1 * 11/2002 Hanakawa et al. .......... 296/191
2008/0061179 A1 * 3/2008 Yoshida et al. .............. 242/379

FOREIGN PATENT DOCUMENTS

JP    5-56758    7/1993

* cited by examiner

*Primary Examiner*—Lori L Lyjak
(74) *Attorney, Agent, or Firm*—Rankin, Hill & Clark LLP

(57) ABSTRACT

A vehicle body side structure, which includes: a pillar having a closed cross section formed by jointing a pillar inner panel and an outer panel; a vehicle interior side face, on which an opening is disposed, of the pillar; a seat belt retractor to be arranged inside the pillar by being inserted through the opening; a boxy member, in which the seat belt retractor is housed to be arranged in the opening, having a flange portion and a bottom back face; and a structural foaming member for jointing at least one of the flange portion and the bottom back face to an inner surface of the pillar.

4 Claims, 5 Drawing Sheets

VEHICLE BODY SIDE STRUCTURE

CROSS REFERENCE TO RELATED APPLICATIONS

This application claims the foreign priority benefit under Title 35, United States Code, §119(a)-(d) of Japanese Patent Application No. 2007-073050, filed on Mar. 20, 2007, the contents of which are hereby incorporated by reference.

BACKGROUND OF THE INVENTION

1. Field of the Invention

The present invention relates to a vehicle body side structure for obtaining rigidity against impact energy upon a side impact of a vehicle with obstacles, or upon a roll over of the vehicle.

2. Description of Related Art

Conventionally, a vehicle body side structure which absorbs impact energy upon a side impact of a vehicle with obstacles or upon a roll over of the vehicle has been known, which is disclosed in Japanese Utility Model Patent Laid-open Publication No. H05-56758 (see FIG. 3 and FIG. 4).

As shown in FIG. 5, the vehicle body side structure disclosed in the Japanese Utility Model Patent Laid-open Publication No. H05-56758 includes a first impact absorber 500 made of a foaming resin between a stiffener 300 disposed inside an outer panel 200 of a pillar 100 and an inner panel 400, and a second impact absorber 600 made of a foaming resin on a floor panel. In a lower portion of the pillar 100, a seat belt retractor 700 for winding up a seat belt is disposed inside the pillar. The seat belt retractor 700 is disposed between the first impact absorber 500 and second impact absorber 600 so as to absorb the impact energy upon a side impact of the vehicle with obstacles.

The vehicle body side structure constituted as described above can effectively absorb impact energy applied to a vehicle interior direction (direction of arrow a) from a vehicle exterior side portion.

However, in the vehicle body side structure disclosed in the Japanese Utility Model Patent Laid-open Publication No. H05-56758, as shown in FIG. 5, the pillar 100 can not absorb an impact force when the impact force is applied to an upper portion, which is above the seat belt retractor 700, of the pillar 100 upon a side impact or roll over of the vehicle in a direction of an arrow b from the vehicle exterior side portion.

As a result, a part of the pillar 100 may be buckling-distorted by receiving a bending moment in the vehicle interior direction (direction of arrow c).

The present invention has been developed for solving the above issue.

It is, therefore, an object of the present invention to provide a vehicle body side structure which has improved bending rigidity against an impact force upon a side impact or roll over of the vehicle.

SUMMARY OF THE INVENTION

To solve the issue described above, according to a first aspect of the present invention, there is provided a vehicle body side structure, which includes: a pillar having a closed cross section formed by jointing a pillar inner panel and an outer panel; a vehicle interior side face, on which an opening is disposed, of the pillar; a seat belt retractor to be arranged inside the pillar by being inserted through the opening; a boxy member, in which the seat belt retractor is housed to be arranged in the opening, having a flange portion and a bottom back face; and a structural foaming member for jointing at least one of the flange portion and the bottom back face to an inner surface of the pillar.

In the vehicle body side structure according to the first aspect, since the seat belt retractor is housed in the boxy member and arranged in the opening, the seat belt retractor can be protected from the impact applied to the retractor upon a side impact or roll over of the vehicle by buffering the impact by the boxy member. In addition, since the boxy member is jointed to the inner surface of the pillar through at least one of the flange portion and bottom back face by the structural foaming member, the impact upon the side impact or roll over of the vehicle can be buffered by the structural foaming member. Therefore, a local lack of strength of the inner panel caused by disposing the opening thereon can be compensated for. Accordingly, the seat belt retractor disposed on the vehicle body side portion can be protected from impact by improving the rigidity of the vehicle body side portion such as the pillar.

According to a second aspect of the present invention, there is provided a vehicle body side structure according to the first aspect, wherein the bottom back face is jointed to the outer panel or a stiffening member disposed on a vehicle interior side of the outer panel by the structural foaming member.

In the vehicle body side structure according to the second aspect, the impact applied to the boxy member from the stiffening member or outer panel upon a side impact or roll over of the vehicle can be buffered by jointing the bottom back face of the boxy member to the outer panel or stiffening member disposed on the vehicle interior side of the outer panel by using the structural foaming member. As a result, since the rigidity of the vehicle body side portion such as the pillar is further improved, the seat belt retractor disposed on the vehicle body side portion can be protected from the impact upon a side impact or roll over of the vehicle.

According to a third aspect of the present invention, there is provided a vehicle body side structure according to the first or second aspect, wherein a lower side of the flange portion of the boxy member is jointed to an upper portion of a side sill extending in a front-rear direction of a vehicle body by the structural foaming member, wherein a side portion of the side sill is held by a lateral member arranged in a vehicle width direction of a vehicle.

In the vehicle body side structure according to the third aspect, the lower side of the flange portion of the boxy member is jointed to the upper portion of the side sill which has rigidity by being held with the lateral member. Therefore, a load upon a side impact or roll over of the vehicle applied to the vehicle body side portion such as the pillar and side sill from the vehicle exterior side to the vehicle interior direction can be supported by the lateral member. As a result, since the boxy member can be jointed to the side sill, which has rigidity, through the structural foaming member having a buffering function, the boxy member can be provided with rigidity and buffering property against the impact upon a side impact or roll over of the vehicle.

According to the vehicle body side structure of the present invention, bending rigidity of the vehicle body side structure against a side impact or roll over of the vehicle can be improved, and thus the seat belt retractor can be protected from the impact by absorbing impact energy applied to the seat belt retractor, which is disposed in the vehicle body side portion.

DETAILED DESCRIPTION OF THE PREFERRED EMBODIMENT

Figure 1:
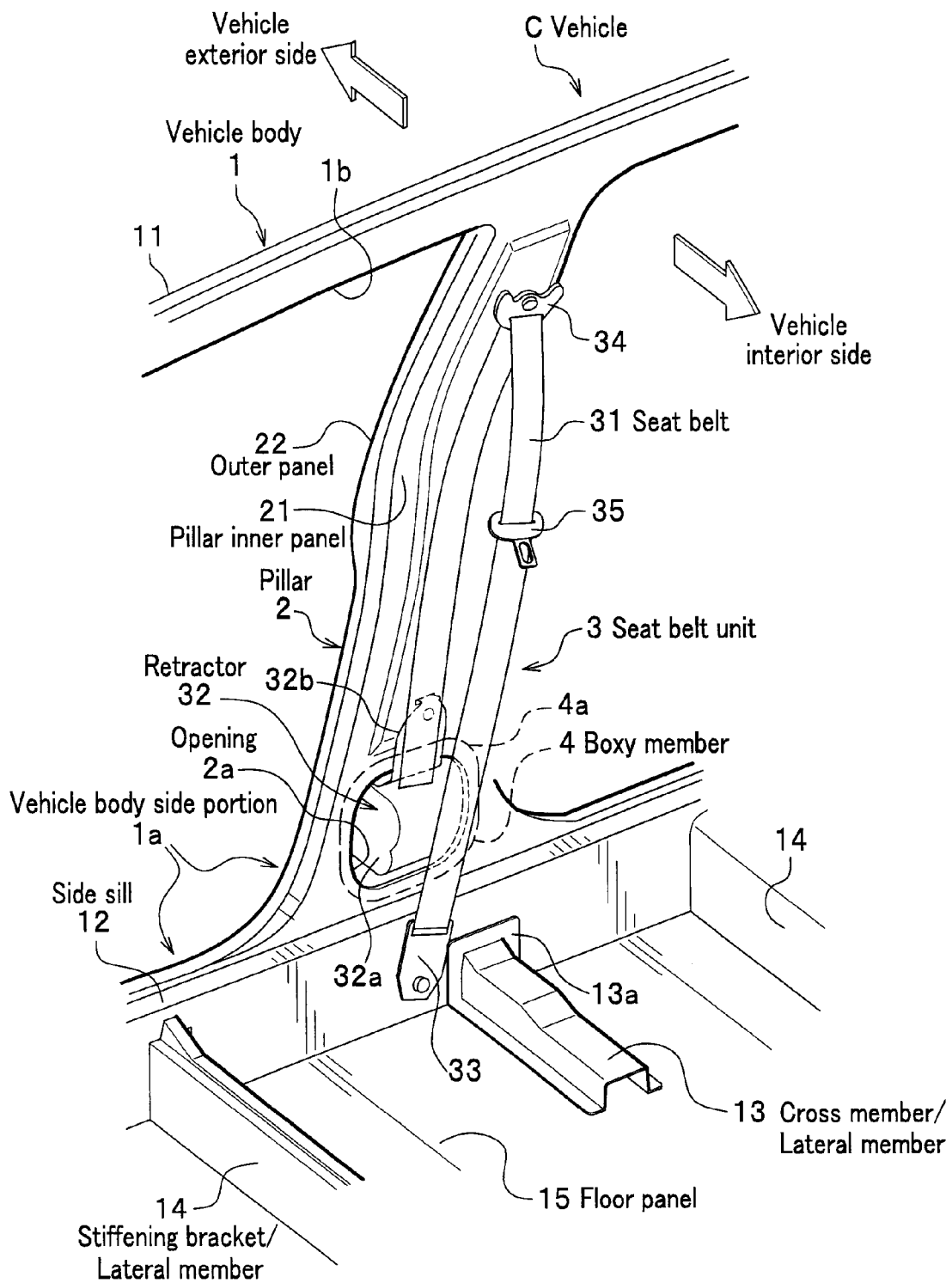
FIG. 1 is a main part schematic perspective view showing a vehicle body side structure according to an embodiment of the present invention.

Next, a vehicle body side structure according to an embodiment of the present invention will be explained by referring to FIG. 1 to FIG. 4. FIG. 1 is a main part schematic perspective view showing the vehicle body side structure according to the embodiment.

It is noted that in the embodiment, a "front" means a forward motion side of a vehicle, a "rear" means a rearward motion side of the vehicle, an "upper side" means a vertically upper side, a "lower side" means a vertically lower side, and a "right-left" direction means a vehicle width direction.

<<Constitution of Vehicle>>

First, a vehicle C in which the present invention is adapted will be explained before explaining the vehicle body side structure according to the embodiment of the present invention.

As shown in FIG. 1, the vehicle C includes, for example, a pillar 2, and a type and a shape of the vehicle C are not limited. That is, if the vehicle C is provided with the pillar 2 on a vehicle body 1, the vehicle C may be, for example, a passenger car, motor truck, or service vehicle. Hereinafter, a vehicle body side portion 1a on the right side of a passenger car having a center pillar as the pillar 2 will be explained as an example.

In the vehicle C, a seat belt retractor (hereinafter, referred to as retractor) 32 for winding up a seat belt 31 of a seat belt unit 3, which is used for protecting a driver and passenger by fastening them by the seat belt, is disposed in a lower portion of the pillar 2.

<<Constitution of Vehicle Body>>

As shown in FIG. 1, the vehicle body 1 forms a whole vehicle C, and includes, for example, various types of metal vehicle body frames such as a cross member 13, described later, and various types of metal vehicle body panels such as a floor panel 15. The vehicle body side portion 1a of the vehicle body 1 is provided with a door opening 1b for the driver seat, and the door opening 1b can be opened and closed by a door (not shown).

Meanwhile, since the vehicle body side portion 1a of the vehicle body 1 is constituted substantially symmetrically, an explanation about the passenger seat side (left side) will be omitted.

<Constitution of Vehicle Body Side Portion>

As shown in FIG. 1, the vehicle body side portion 1a forms a right side portion or left side portion of the vehicle body 1. The vehicle body side portion 1a includes, for example, a front pillar (not shown) disposed on a front side of the door opening 1b, a pillar (center pillar) 2 disposed on a rear side of the door opening 1b, a side frame 11 disposed on an upper side of the door opening 1b, a pair of right and left side sills 12 disposed on a lower side of the door opening 1b and extending in a front-rear direction of the vehicle C, a cross member (lateral member) 13 disposed on a side portion of the side sills 12 and directed in the vehicle width direction, a stiffening bracket (lateral member) 14, and a floor panel 15 laid down beneath the cross member 13 and stiffening bracket 14.

<Constitution of Side Frame>

The side frame 11 is a member which is disposed orthogonally to an upper end portion of the pillar 2 for holding a roof, and constituted with a pair of right and left members disposed along the front-rear direction of the vehicle C. The side frame 11 forms an upper periphery of the door opening 1b. The side frame 11 is formed in, for example, such a manner that two metal plates having a cross section of substantially a squared U-shape in front view are jointed to form a closed cross section.

<Constitution of Side Sill>

As shown in FIG. 1, the side sill 12 is a member which is disposed orthogonally to a lower end portion of the pillar 2 and supports, for example, the cross member 13, stiffening bracket 14, and floor panel 15. The side sill 12 is constituted with a pair of right and left members disposed along the front-rear direction of the vehicle C. In other words, a side portion of the side sill 12 is held by the cross member (lateral member) 13 and stiffening bracket (lateral member) 14, which are disposed directed in the vehicle width direction of the vehicle C. The side frame 12 is formed in such a manner that two metal plates having a cross section of substantially a squared U-shape in front view are jointed to form a closed cross section.

<Constitution of Cross Member>

The cross member 13 is a lateral member disposed between the right and left side sills and made of a thick metal plate such as a steel plate having rigidity, whose bottom side is opened and whose cross section in side view is substantially a hat shape. The cross member 13 is provided with a guard portion 13a for jointing and stiffening, for example, at a bottom end portion of front and rear portions and right and left end portions of the cross member 13. The cross member 13 is jointed to inner side surfaces of the side sills 12 through the guard portion 13a disposed at the right and left end portions of the cross member 13 by, for example, spot-welding and to the floor panel 15 in a similar way through the guard portion 13a at the bottom end portion, and extends in the vehicle width direction.

<Constitution of Stiffening Bracket>

The stiffening bracket 14 is a stiffening member (lateral member) disposed between the right and left side sills 12 or between the side sill 12 and a center sill (not shown) and made of a metal plate such as a steel plate having substantially a square cross sectional shape (shape forming closed cross section) in side view. The stiffening bracket 14 is jointed to the inner side surfaces of the side sills 12 through right and left end portions of the stiffening bracket 14 by, for example, spot-welding and to the floor panel 15 through a bottom of the stiffening bracket 14, and extends in the vehicle width direction.

<Constitution of Floor Panel>

As shown in FIG. 1, the floor panel 15 is made of a relatively thin metal plate such as a steel plate forming a floor of the vehicle interior, and laid down between the right and left side sills 12. The cross member 13 and stiffening bracket 14 are welded to an upper surface of the floor panel 15. A floor frame (not shown) is disposed beneath the floor panel 15.

<Constitution of Pillar>

Figure 2:
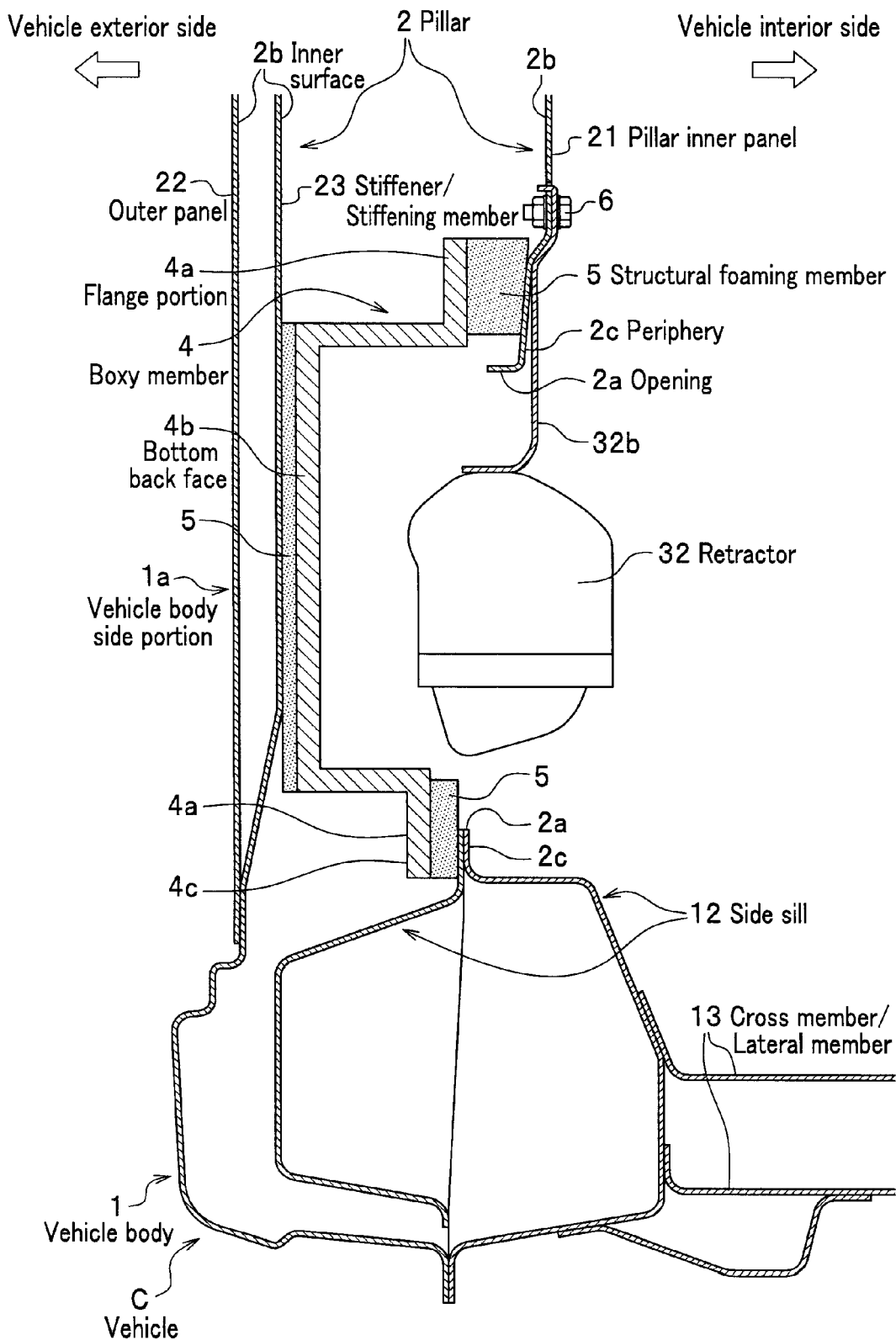
FIG. 2 is an illustration showing a vehicle body side structure according to the embodiment, in which a longitudinal cross sectional view of a lower center portion of a pillar is shown.

The pillar 2 is a pillar shape member constituting a part of the vehicle body side portion 1a and disposed between the side frame 11 and side sill 12, extending in the vertical direction. As shown in FIG. 2, for example, the pillar 2 is a tubular member forming a closed cross section by jointing a pillar inner panel 21, outer panel 22, and stiffener 23 as a stiffening member. An opening 2a for housing a retractor 32 inside the pillar 2 is formed on a vehicle interior side face of the pillar 2.

An upper half of a vehicle interior side of the pillar 2 is covered with a pillar garnish (not shown) of an interior material. The opening 2a and retractor 32 are disposed in a lower half of the vehicle interior side of the pillar 2 is covered with a side lining (not shown).

<Constitution of Pillar Inner Panel>

As shown in FIG. 2, the pillar inner panel 21 is a member forming a surface of a vehicle interior of the pillar 2, and formed by, for example, pressing a metal plate member such as a steel plate.

<Constitution of Outer Panel>

The outer panel 22 is a member forming a surface of a vehicle exterior side of the pillar 2, and formed by, for example, pressing a metal plate member such as a steel plate.

<Constitution of Stiffener (Stiffening Member)>

As shown in FIG. 2, the stiffener 23 is a member for improving strength and bending rigidity of the pillar 2 by being jointed inside the pillar 2 which is formed in a pillar shape by jointing the pillar inner panel 21 and outer panel 22. The stiffener 23 is formed by, for example, pressing a metal plate member such as a steel plate.

It is noted that the stiffener 23 corresponds to a stiffening member.

<Constitution of Seat Belt Unit>

As shown in FIG. 1, the seat belt unit 3 is used for fastening, for example, an upper body of a passenger seated on a seat (not shown) by a seat belt (so-called webbing) 31. The seat belt unit 3 includes the seat belt 31, retractor 32 for winding up one end of the seat belt 31, anchor 33 for fixing the other end of the seat belt 31 to the vehicle body 1, through-anchor 34 which is disposed in an upper portion of the pillar 2 and through which the seat belt 31 passes, tongue 35 which is arranged between the through-anchor 34 and anchor 33 and through which the seat belt 31 passes, and buckle (not shown) to which the tongue 35 is put on and took off for fixing the passenger to, for example, the seat.

<<Constitution of Retractor (Seat Belt Retractor)>>

The retractor 32 is a seat belt winding up unit provided with a pretensioner 32a for reducing a slack of the seat belt 31 and a load limiter device (not shown). The retractor 32 is inserted from the opening 2a and arranged inside the pillar 2.

Figure 3:
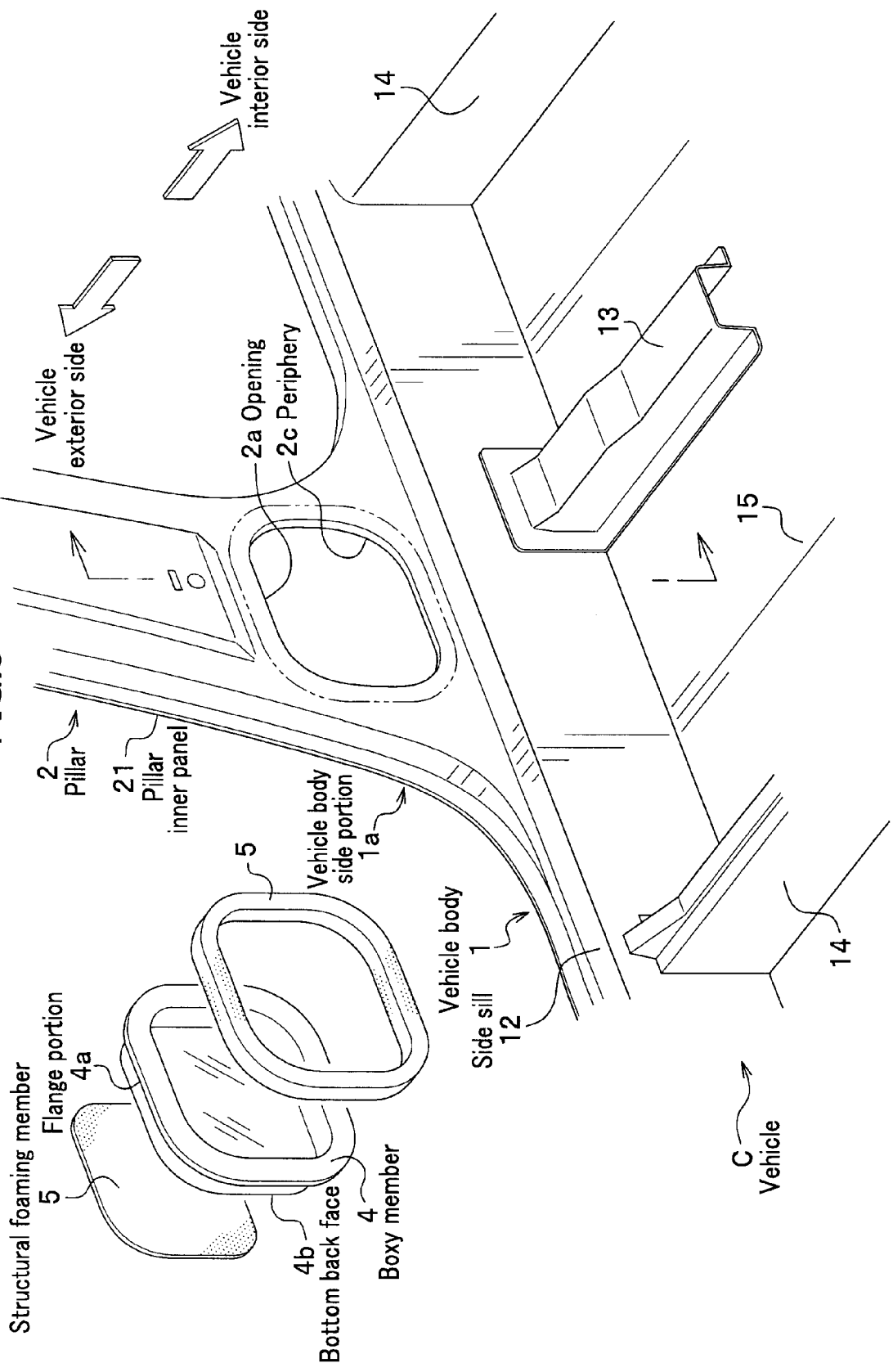
FIG. 3 is a main part schematic perspective view showing a vehicle body side structure according to the embodiment, in which the main part is enlarged and exploded.

FIG. 2 is an illustration showing a vehicle body side structure according to the embodiment of the present invention, in which a longitudinal cross sectional view of a lower center portion of a pillar is shown. FIG. 3 is a main part schematic perspective view of a vehicle body side structure according to the embodiment, in which the main part is enlarged and exploded.

As shown in FIG. 2, the retractor 32 is arranged inside the opening 2a of the pillar 2 by being housed in a boxy member 4 (see FIG. 3) which has a flange portion 4a, and covered with a side lining (not shown) disposed on the vehicle interior side of the pillar 2. The retractor 32 is provided with a fixing bracket 32b thereon, and the fixing bracket 32b is fixed to an upper side of the opening 2a of the pillar inner panel 21 by a fastening member 6.

<<Constitution of Boxy Member>>

The boxy member 4 is a protector for housing the retractor 32 by covering the vehicle exterior side of the retractor 32, and has the flange portion 4a at its opening periphery. The boxy member 4 is made of synthetic resin such as reinforced plastics or metal such as iron. The boxy member 4 is jointed to at least one of a periphery 2c of the opening 2a of the pillar inner panel 21 through the flange portion 4a and a stiffener 23 forming an inner surface 2b of the pillar 2 through a bottom back face 4b of the boxy member 4, by using a structural foaming member 5. A lower side 4c of the flange portion 4a of the boxy member 4 is jointed to an upper portion of the side sills 12 extending in the front-rear direction of the vehicle body 1, by using the structural foaming member 5. When the vehicle C is assembled, the boxy member 4 is set in the pillar 2 before painting the vehicle body 1, and bonded to an inside of the pillar 2 by foaming a structural foaming agent with a paint drying oven.

As described above, the boxy member 4 is bonded to the opening 2a so as to shut the opening 2a from an inner side of the pillar 2 by the structural foaming member 5 which has a buffering function and adhesive function. Also, the boxy member 4 is bonded to the inner surface 2b on the vehicle exterior side of the pillar 2. Therefore, the boxy member 4 has an additional function as a stiffening member of the pillar 2.

It is noted if the boxy member 4 is jointed to at least one of the periphery 2c of the opening 2a through the flange portion 4a and the stiffener 23 which forms the inner surface 2b of the pillar 2 through the bottom back face 4b of the boxy member 4 by using the structural foaming member 5, the boxy member 4 need not be jointed to the other . If not jointed to the stiffener 23, the bottom back face 4b of the boxy member 4 is jointed to the inner surface 2b of the pillar 2.

<<Constitution of Structural Foaming Member>>

The structural foaming member 5 is a structural adhesive agent used for adhering structural members and has a function to absorb impact energy (shock-absorbing properties). The structural foaming member 5 is, for example, an epoxy foaming filler and urethane foaming filler. Product names of the structural foaming member 5 are, for example, "TERO-CORE" made by Cemedine Henkel Co., Ltd. and "L-5218" made by L & L Products, Inc.

<<Effects of Vehicle Body Side Structure>>

Next, effects of the vehicle body side structure according to the embodiment of the present invention will be explained by referring to FIG. 2 and FIG. 4.

As shown in FIG. 2, the opening 2a for installing the retractor 32 is disposed on the vehicle interior side face of the pillar 2 which is formed to have a closed cross section by jointing the pillar inner panel 21 and outer panel 22. The stiffener 23 is disposed inside the pillar 2, thereby resulting in improvement of strength and rigidity of the pillar 2 as a pillar.

Since the flange portion 4a of the boxy member 4 is bonded to the periphery 2c of the opening 2a by the structural foaming member 5, the opening 2a is shut from the inner surface 2b of the pillar 2. In addition, the bottom back face 4b of the boxy member 4 is fixed to the stiffener 23 by being bonded with the structural foaming member 5. Therefore, in the pillar 2, a whole periphery 2c of the opening 2a is built on the stiffener 23 through the boxy member 4. As a result, a distance between the pillar inner panel 21 and the stiffener 23 is always kept constant by the boxy member 4, thereby resulting in improvement of strength of the pillar 2. Accordingly, a local lack of the strength of the pillar 2 caused by disposing the opening 2a can be compensated.

Figure 4:
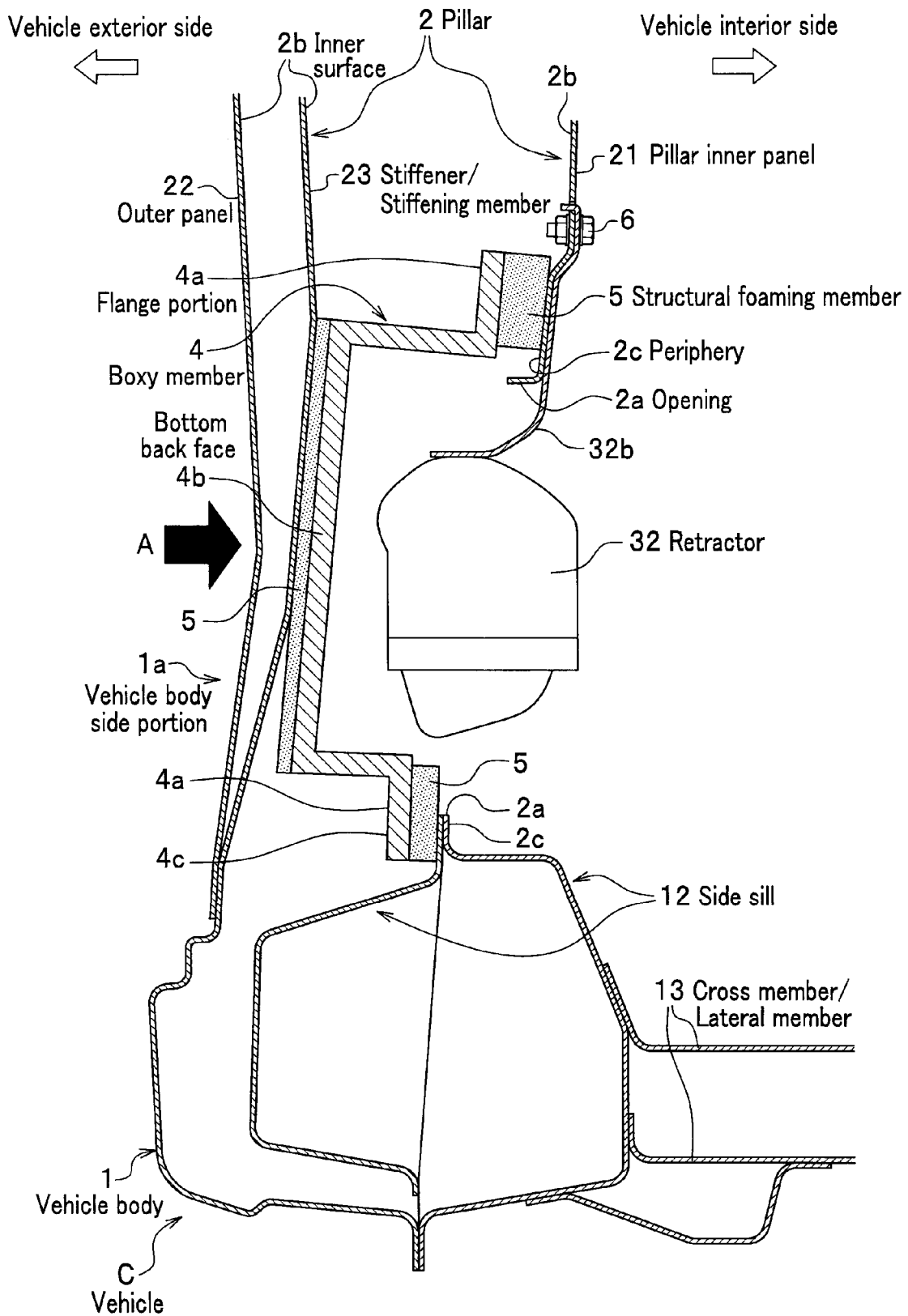
FIG. 4 is a main part enlarged schematic cross sectional view showing a vehicle body side structure according to the embodiment, in which a status that an impact force is applied to an opening of a pillar from a vehicle exterior side to vehicle interior side is shown.
Figure 5:
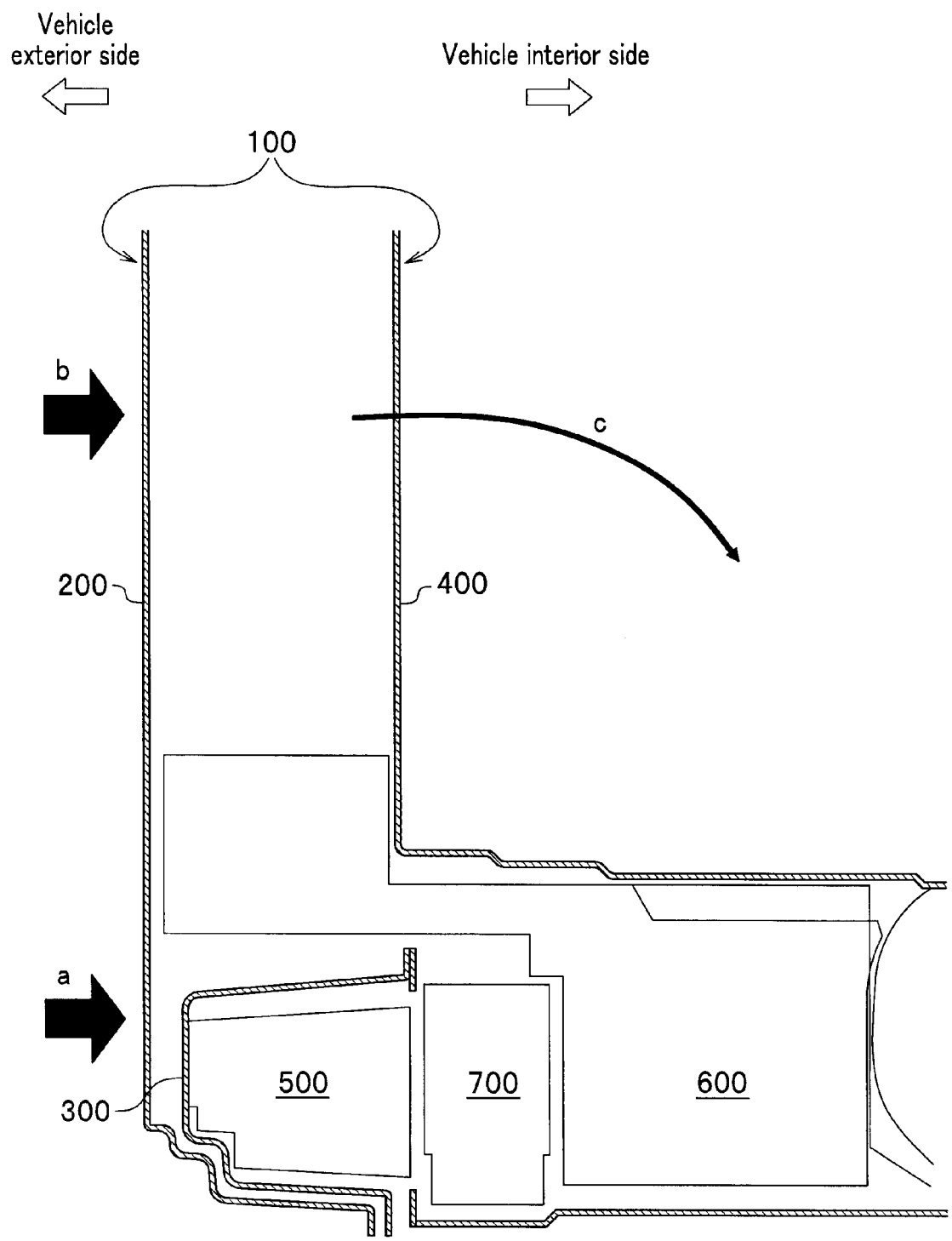
FIG. 5 is a main part schematic cross sectional view showing a conventional vehicle body side structure.

FIG. 4 is a main part enlarged schematic cross sectional view showing a vehicle body side structure according to the embodiment, in which a status that an impact force is applied to an opening of a pillar from a vehicle exterior side to vehicle interior side is shown.

According to the effects described above, as shown in FIG. 4, even if an impact force in a direction of arrow A is applied to the pillar 2 from the vehicle exterior side to vehicle interior side upon a side impact or roll over of the vehicle C, loading of the impact force on the retractor 32 can be suppressed because the distance between the periphery 2c of the opening 2a of the pillar inner panel 21 and the stiffener 23 is kept constant by the boxy member 4.

In this case, since the vehicle exterior side and vehicle interior side of the boxy member 4 are fixed by the structural foaming member 5, the boxy member 4 does not displace even if the impact force is applied. Therefore, the retractor 32 housed in the boxy member 4 can be protected by absorbing the impact on the retractor 32.

In addition, the lower side 4c of the flange portion 4a of the boxy member 4 is jointed, by the structural foaming member 5, to the upper portion of the side sill 12 which is provided with rigidity by being held with the cross member 13 and the stiffening bracket 14 (see FIG. 1). Therefore, the pillar 2 and side sill 12 can bear a load directed to the vehicle interior direction from the vehicle exterior side upon a side impact or roll over of the vehicle C.

That is, the rigidity and buffering property of the pillar 2 against a side impact are increased since the boxy member 4 is jointed to the side sill 12, which has rigidity, through the structural foaming member 5 having a buffering function.

As a result, the retractor 32 can be prevented from breaking due to loading of the impact force upon a side impact or roll over of the vehicle C.

According to the vehicle body side structure of the present invention, a bending rigidity against an impact force upon a side impact or roll over of the vehicle can be improved, and an impact energy applied upon the side impact to the seat belt retractor disposed in the vehicle body side portion can be absorbed, thereby resulting in protection of the seat belt retractor from the impact.

MODIFIED EXAMPLE

It is noted that the present invention is not limited to the embodiment described above, and can be modified in various forms without departing from the spirit of the technical idea of the present invention. It is obvious that these modified forms are included in the present invention.

For example, the structural foaming member 5 may be, for example, an adhesive agent having elasticity like a rubber such as polyurethane and silicone, which have a good adhesiveness to metal.

What is claimed is:

1. A vehicle body side structure, comprising:
   a pillar having a closed cross section formed by jointing a pillar inner panel and a stiffener;
   a vehicle interior side face of the pillar, wherein the vehicle interior side face of the pillar defines an opening;
   a seat belt retractor arranged inside the pillar, wherein the seat belt retractor is installed through the opening defined in the vehicle interior side face of the pillar;
   a boxy member, in which the seat belt retractor is housed, the boxy member arranged in the opening and having a flange portion and a bottom back face; and
   a structural foaming member for jointing at least one of the flange portion and the bottom back face to an inner surface of the pillar,
   wherein an entire periphery of the opening is jointed to the flange portion of the boxy member by the structural foaming member and the opening is sealed off from an inner surface of the pillar;
   wherein the bottom back face of the boxy member is jointed and fixed to the stiffener by the structural foaming member; and
   wherein the entire periphery of the opening is held by the stiffener through the boxy member.

2. The vehicle body side structure according to claim 1, wherein the bottom back face is jointed by the structural foaming member to at least one of the outer panel and a stiffening member disposed on a vehicle interior side of the outer panel.

3. The vehicle body side structure according to claim 1, wherein a lower side of the flange portion of the boxy member is jointed to an upper portion of a side sill extending in a front-rear direction of a vehicle body by the structural foaming member,
   wherein a side portion of the side sill is held by a lateral member arranged in a vehicle width direction of a vehicle.

4. The vehicle body side structure according to claim 2,
   wherein a lower side of the flange portion of the boxy member is jointed to an upper portion of a side sill extending in a front-rear direction of a vehicle body by the structural foaming member,
   wherein a side portion of the side sill is held by a lateral member arranged in a vehicle width direction of a vehicle.

* * * * *